United States Patent Office 2,911,386
Patented Nov. 3, 1959

2,911,386

REACTING PHENYLALKOXY SILOXANES WITH HIGHER FATTY ALCOHOLS

Melvin M. Olson, Milwaukee, and Roger M. Christenson, Whitefish Bay, Wis., assignors to Pittsburgh Plate Glass Company No Drawing. Application October 7, 1953
Serial No. 384,761

5 Claims. (Cl. 260—46.5)

This invention relates to novel and useful compounds of silicon of the so-called "silicone" type which are adapted for use as coating media, or for other purposes, and it has particular relation to an important class of arylalkoxypolysiloxanes of exceptional merit.

The preparation of organic silicon compounds containing one or more phenyl groups directly linked to silicon has been disclosed and it has been recognized that these compounds when hardened by baking, are of exceptional resistance to heat. These compounds, however, are too expensive for many applications and have other disadvantages.

It has further been proposed to prepare orthosilicates of higher alcohols such as can be derived by reduction of fatty acids of glyceride oils such as stearyl alcohol, cetyl alcohol, linoleyl alcohol, oleyl alcohol and the like, or mixtures of the same. These previously known materials, however, do not respond too well to hardening by baking and baked films often become quite soft upon exposure to air.

Organopolysiloxanes such as arylpolysiloxanes containing alkoxyl groups of low molecular weight and being represented by ethoxy, butoxy, or the like have also been disclosed. While it has been proposed to mix these with fibrous fillers such as asbestos or wood flour, and then to form the mixture into coatings, they are not well adapted for use as coating media for surfaces of wood, metal or the like because of excessive fluidity, poor plasticity and poor adhesion.

The invention involves the provision of a novel class of valuable and useful alkoxyarylpolysiloxanes in which the alkoxyl groups are of quite high molecular weight and being represented by those containing 11 or more carbon atoms. Such alkoxyl groups are derivable from alcohols produced from the reduction of the carboxyls of fatty acids from glyceride oils to form hydroxyls. These alkoxyarylpolysiloxanes, when applied as coatings to wood, metal, stone or the like, can be baked and thus converted into films of good hardness, plasticity, adhesion, high resistance to heat and which do not soften upon exposure to air.

In preparing the arylpolysiloxane compounds containing alkoxyl groups of high molecular weight in accordance with the provisions of this invention, a preferred procedure involves preliminary preparation of an ester of an arylpolysiloxane and an alcohol of lower molecular weight such as ethyl alcohol, propyl alcohol or preferably butyl alcohol. This intermediate product is then converted by ester interchange reaction with an alcohol of high molecular weight, such as may be derived by reducing the carboxyl group of a glyceride oil acid, to form the desired arylalkoxypolysiloxane. While this apparently constitutes the best and most economical method of preparing the new arylhydrocarbonoxypolysiloxanes of this invention, it is to be recognized that they may also be prepared by other, though presently less desirable, procedures such as direct interaction of an arylchlorosilane with the higher ($C_{11-18}$) alcohol in the presence of an acceptor (such as pyridine) of the evolved hydrogen chloride, followed by hydrolysis of the resulting arylchloroalkoxysilane to an arylalkoxypolysiloxane. Thus hydrolysis is also carried out in the presence of the acceptor.

In the preparation of the intermediate ester for use in the ester interchange reaction, an aryltrichlorosilane may be employed as a starting material. This is reacted with a lower alcohol containing less than 11 carbon atoms to provide an aryltrialkoxysilane which is then hydrolized with water to convert it into an arylalkoxypolysiloxane in which the alkoxyl group is of low molecular weight. The alkoxyl groups of low molecular weight are subsequently replaced by ester interchange reaction by one containing at least 11 and preferably containing 11 to 18 carbon atoms. In the interchange reaction, the higher alcohol is employed in approximately stoichiometric ratio with respect to the alkoxyl groups. However, an excess of the higher alcohol may be employed if so desired. The temperature of reaction employed, preferably, is above the boiling point of the evolved lower alcohol, but below the boiling point of the higher alcohol. Where the evolved alcohol is butyl alcohol, the temperature may conveniently be in a range of about 170 to 210° C. Preferably, the mixture during the reaction is subjected to agitation. A catalyst of ester interchange such as litharge may be included in the reaction mixture, but it is not essential, since the reaction will proceed at a reasonable rate even in its absence.

A reasonable end point for the reaction can be determined by the cessation of the evolution of lower alcohol from the reaction zone. At the conclusion of the reaction, any residual lower alcohol and any excess of higher alcohol (if present) may be removed by distillation. If higher alcohol is to be removed, it is desirable that the distillation be conducted under vacuum in order that the temperature may be sufficiently low to prevent premature setting of the resultant product. The course of the reaction can be represented as follows:

(I) $\quad ArSiCl_3 + 3rOH \longrightarrow ArSi(Or)_3 + 3HCl$ (II)

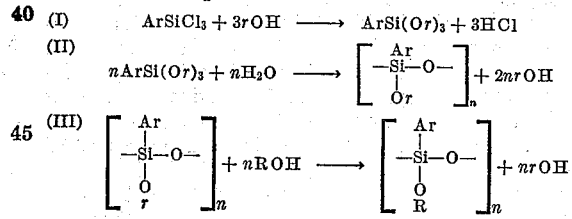

In the formulae, the symbol Ar designates an aryl group such as a phenyl group, a tolyl group or a xylyl group. The symbol $r$ designates a hydrocarbon group of relatively low molecular weight such as propyl, butyl, amyl or the like and the group —R— is an aliphatic hydrocarbon group usually containing from about 11 to 18 carbon atoms. The symbol $n$ designates a whole number usually greater than 2.

It is to be understood that in the preparation of the lower alkoxyarylpolysiloxane compounds, various lower alcohols containing, for example, 3 to 6 or 7 carbon atoms may be employed. These alcohols may be normal or branched chain and are represented by propyl, isopropyl, butyl, isobutyl or secondary butyl, amyl hexyl alcohols.

The higher alcohols which may be employed in conducting the ester interchange reaction of Equation III include such alcohols as stearyl alcohol, palmityl alcohol, cetyl alcohol, lauryl alcohol, oleyl alcohol, linoleyl alcohol, linolenyl alcohol and the alcohols such as may be derived by the reduction of the carboxyl group of elaeostearic acid and others. It will be understood that the arylalkoxypolysiloxane compounds in which the alkoxyl group is saturated and contains 18 (or thereabouts)

carbon atoms, are usually wax-like solids which are soluble in such solvents as toluene, xylene and others and which in the form of solutions of such solvents, may be employed as coating media for surfaces of wood, metal and the like. This type of compound is represented by those in which the alkoxyl group is stearyl or cetyl.

The corresponding esters of higher unsaturated alcohols, such as linoleyl, linolenyl or elaeostearic alcohols and the arylalkoxypolysiloxanes, are liquids and may be employed with or without solvents as coating media and for similar purposes. Alcohols such as lauryl alcohol also provide liquid esters.

The arylalkoxypolysiloxanes, where the alkoxyl groups contain 11 or more carbon atoms, may be employed to form coatings with or without added pigments. Appropriate pigments, if employed, include titanium dioxide, zinc oxide, zinc suphide, calcium carbonate, barium sulfate, wood flour and many others. These are incorporated into the liquid compositions by milling, or other techniques, in an amount to impart a desired color or a desired degree of opacity or other desired properties.

The alkoxyarylpolysiloxanes derived as herein disclosed, when spread as films, may be hardened by baking at a temperature below that of decomposition, for example at a temperature within a range of about 150 to 250° C. Baking should be continued until a desired degree of hardness is obtained, but should be stopped before the films are unduly blackened or decomposed. About 30 minutes to 4 hours is usually sufficient to attain an adequate degree of hardness as determinable by conventional tests. The films when properly baked are hard, tough, flexible, adherent, and do not soften when exposed to air, as do the orthosilicates of higher alcohols previously recognized. The reactions involved in hardening the films appear to be complex and at this time are not fully understood.

The following examples illustrate the preparation of novel and useful arylpolysiloxane esters of higher alcohols.

Example I

In this example, 48.7 grams (0.15 mole) of phenyltributoxysilane prepared from phenyltrichlorosilane and n-butanol, was mixed with a mixture of 20 grams of anhydrous butanol containing 2.21 grams of water and 1.49 grams of 37 percent hydrochloric acid. The mixture was stirred overnight without heating. The next day, the reaction mixture was stirred and heated on a steam bath for one hour, after which 38.5 grams (0.15 equivalent of hydroxyl groups) of alcohols obtained from sodium reduction of soya oil was added. The system was then placed under vacuum generated by a conventional aspirator and was stirred and heated on a steam bath. The reaction was continued for 11 hours while distillate (condensed by a "Dry Ice"-acetone mixture) was collected. The distillate weighed 54.4 grams as against a theoretical yield of 53.3 grams of butanol. The residue weighed 63.1 grams. This residue was stripped by sweeping it with a stream of nitrogen gas for a period of 7 hours and 25 minutes during which time the temperature ranged from 140 to 197° C. The stripped residue weighed 44.8 grams, a yield of 98 per cent based upon the theoretical.

The product was a liquid which could be spread as a film upon a solid surface such as wood or metal and baked at a temperature of 200° C. to provide a hard, tough, adherent and flexible coating.

Example II

In this example, a 250 milliliter, 3-necked, round-bottom flask was employed as a reaction vessel. The flask was equipped with a stirrer and a reflux condenser and was charged with 48.7 grams (0.15 mole) of previously prepared phenyltributoxysilane. To this was added as a catalyst 0.945 (0.00756 mole) of oxalic acid dihydrate and 2.43 grams (0.135 mole) of water dissolved in 25.15 grams of anhydrous n-butanol. This mixture was stirred and heated on a steam bath for 7 hours at the conclusion of which time, 28.1 grams (0.15 mole) of n-dodecyl alcohol was added, the reaction mixture was placed under an aspirator vacuum pump as described in Example I and was stirred at a temperature of 100° C. for a period of 15 hours. A trace of litharge (catalyst) was then added and the mixture was heated at 135 to 140° C. for 16 hours, during which time it was subjected to stirring under the vacuum generated by the aspirator pump. The temperature was then raised for 3 hours to a value of 170 to 175° C. Finally, the mixture was stripped for a period of one and one-half hours at 175 to 185° C. by the action of a stream of nitrogen gas bubbled into the mixture. The weight of the residue remaining was 45.1 grams which is 99.5 percent of theoretical.

The alcohol (in this instance dodecyl) is saturated. The product is a wax which can be dissolved in solvents, spread as a film and baked to a hard, durable film, of good resistance to heat decomposition.

Example III

In this example, 1063 grams (5.03 moles) of phenyltrichlorosilane was disposed in a 3 liter, 3-necked, round bottom flask equipped with a stirrer, a reflux condenser and a dropping funnel. A 1660 gram (22.5 mole) quantity of n-butanol was then added as a slow stream, after which the reaction mixture was allowed to stand overnight and for 8 hours of the following day, while being swept with a stream of carbon dioxide. The excess butanol and the residue were distilled under vacuum. The fraction boiling from 116° C. at a pressure of 0.06 millimeter of mercury to 1 to 5° C. at a pressure of 0.15 millimeter (pressures are absolute) was collected as phenyltributoxysilane. The weight of the product was 907 grams. A 555 gram quantity (1.71 moles) of phenyltributoxysilane prepared as above described was disposed in a reaction flask and 30.2 grams (1.67 moles) of water dissolved in 184.9 grams of anhydrous n-butyl alcohol together with 0.16 gram of litharge (catalyst) was added. This mixture was stirred and refluxed for 20 hours after which butanol was removed by distillation under reduced pressure. To the product, which was phenylbutoxypolysiloxane, was added about 450 grams (1.71 equivalents of hydroxyl groups) of alcohols obtained by sodium reduction of linseed oil. The mixture was heated at 140 to 150° C. overnight and was then further heated at 180 to 190° C. for 30 minutes. During this latter time, volatile components were removed under an aspirator pump and condensed. The total distillate weighed 522 grams and the residue, which was phenyl-linoxypolysiloxane, weighed 699 grams. The residue, after being stripped for 3½ hours at 180° C. under a pressure of less than 10 millimeters (absolute) while being swept with a stream of dry combustion gases, weighed 695 grams.

This product was a liquid suitable for application as a coating to surfaces of stone, metal and the like. Such coatings when baked are hard, flexible, adherent and heat resistant.

Example IV

In this example a mixture of 649 grams (2 moles) of phenyltributoxysilane, 36 grams (2 moles) of water and 300 grams of anhydrous butanol were refluxed overnight. On the following day the butanol was distilled off to provide a 555.7 gram distillate. The residue consisting largely of phenylbutoxypolysiloxane was mixed with 2 moles (541 grams) of octadecyl alcohol and 0.4 gram of litharge and the mixture was stirred and heated at 180° C. to 210° C. under an aspirator pump for 2 hours and was filtered while warm. The product was a wax-like material adapted for solution in solvents as previously described for the purposes of providing coating materials. The products when spread as surface coatings, could be dried by baking as previously described.

The following example illustrates the use of the phenylalkoxypolysiloxane of this invention as modifier of a typical alkyd resin coating composition:

*Example V*

The phenylalkoxypolysiloxane in this example was of alcohols derived by the sodium reduction in the presence of linseed oil and was of essentially the composition of the product of Example III. This ester was mixed with a short oil alkyd mixture comprising coconut oil-modified glyceryl phthalate and cottonseed oil modified glyceryl phthalate. The mixture was further modified with amino resins, namely a mixture of urea-formaldehyde resin and melamine-formaldehyde resin. The vehicle was also pigmented with titanium dioxide (rutile type) and was mixed with diluents to desired viscosity.

The proportions of the solids were as follows:

| Solids: | Percent (by weight) |
|---|---|
| Phenyllinoxypolysiloxane | 12.5 |
| Coconut-oil-modified alkyd | 4.7 |
| Cottonseed oil modified alkyd | 20.4 |
| Melamine-formaldehyde resin | 12.5 |
| Urea-formaldehyde resin | 12.5 |
| Titanium dioxide | 37.3 |

The material was diluted with a solvent mixture to provide a composition of 66 percent by weight of solids and 34 percent by weight diluent or solvent mixture. The composition of the latter mixture was:

| Solvent: | Percent (by weight) |
|---|---|
| Pine oil | 3.0 |
| Butanol | 29.7 |
| Xylene | 34.0 |
| Acetate of monobutylether of ethyleneglycol | 3.0 |
| High boiling petroleum naphtha | 30.0 |

Test panels were coated with this composition and were cured for 30 minutes at 300° F. The gloss and color of the films was good. They were further over-baked at 400° F. for 1 hour. The gloss and color were still good showing good resistance to heat deterioration. The films were hard, mar-resistant, resistant to spalling and resistant to staining. They did not fail in 3 percent sodium hydroxide, even after one hundred (100) hours' exposure.

It is to be understood that the invention is not limited to the use of such simple higher alcohols as may be derived by reduction of a glyceride oil. More complex alcohols containing at least 11 carbon atoms, such as may be derived by partial hydrolysis, or alcoholysis of a glyceride oil where the acid radicals contain 11 to 18 carbon atoms may be employed. Useful coating compositions can be obtained by ester interchange reaction between an arylalkoxypolysiloxane such as phenylbutoxypolysiloxane and a partial glyceride (e.g., a mono- or di-glyceride) from a glyceride oil such as linseed oil or soya oil. Mixtures of mono- and di-glycerides of these oils may also be employed.

*Example VI*

React by ester interchange phenylbutoxypolysiloxane in a ratio of about one mole with a di-glyceride of linseed oil in a ratio of one mole per butoxy group in the polysiloxane. The reaction, preferably, is conducted in the presence of a small, catalytic amount of litharge and at a temperature of 180 to 210° C. The reaction may be promoted by application of vacuum to remove evolved butyl alcohol and thus to form the ester of phenylpolysiloxane and the di-glyceride. This is a coating medium and has air drying properties.

*Example VII*

This example is a repetition of Example VI, but with one-half mole of mono-glyceride of linseed oil in place of the di-glyceride. Reaction should be stopped when reasonable viscosity is attained. It preferably is stopped before gelation occurs.

The embodiments of the invention herein given are by way of illustration. It will be apparent to those skilled in the art that many modifications may be made therein without departure from the spirit of the invention or the scope of the appended claims.

We claim:

1. A method of forming a liquid coating material which can be baked at about 150° C. to about 250° C. in 0.5 to 4 hours to a hard, durable state, which comprises mixing (A) a liquid phenylalkoxypolysiloxane containing phenyl groups and alkoxy groups in about equal numbers, the alkoxy groups being of about 3 to 6 carbon atoms in chain length with (B) an alcohol of a class consisting of:

Lauryl alcohol
Cetyl alcohol
Stearyl alcohol
Palmityl alcohol
Oleyl alcohol
Linoleyl alcohol
Linolenyl alcohol
Elaeostearyl alcohol said alcohol being employed in about stoichiometric ratio with respect to the alkoxy groups, and heating the mixture at a temperature in a range of about 170° C. to about 210° C. until ester interchange between the phenylalkoxypolysiloxane and the alcohol of said class is completed.

2. A method of forming a liquid coating material which can be baked at about 150° C. to 250° C. in about 0.5 to about 4 hours to a hard, durable state, which comprises mixing (A) a liquid phenylalkoxypolysiloxane containing phenyl groups and alkoxy groups in about equal numbers, the alkoxy groups being of about 3 to 6 carbon atoms chain length, with (B) a monohydric straight chain alcohol containing a plurality of double bonds in the hydrocarbon moiety, said moiety being of 18 carbon atoms chain length, said alcohol being present in about equal molar amount with respect to the alkoxy groups in said phenylalkoxypolysiloxane and heating the mixture at a temperature in a range of about 170° C. to about 210° C. until ester interchange between the phenylalkoxypolysiloxane and the alcohol is completed.

3. A method of forming a liquid coating material which can be baked at about 150° C. to about 250° C. in about 0.5 to about 4 hours to a hard, durable state, which comprises mixing (A) a liquid phenylalkoxypolysiloxane containing phenyl groups and alkoxy groups in about equal numbers, the alkoxy groups being of about 3 to 6 carbon atoms in chain length, said phenylalkoxypolysiloxane being the product of hydrolyzing a phenyltrialkoxysiloxane in which the alkoxy groups are of 3 to 6 carbon atoms in chain length, with about an equal molar ratio of water, the water being dissolved in a monohydric, aliphatic alcohol of 2 to 3 carbon atoms chain length, until hydrolysis is complete; with (B) an alcohol of the class consisting of:

Lauryl alcohol
Cetyl alcohol
Stearyl alcohol
Palmityl alcohol
Oleyl alcohol
Linoleyl alcohol
Linolenyl alcohol
Elaeostearyl alcohol, the alcohol of said class being employed in about equal molar ratio with respect to the alkoxy groups in the phenylalkoxypolysiloxane and heating the mixture at a temperature in a range of about 170° C. to about 210° C. until said ester interchange between the phenylalkoxypolysiloxane and the alcohol of said class is completed.

4. The method of claim 1 in which the alkyl moieties of the alkoxy groups are butyl groups.

5. The method of claim 3 in which hydrocarbon moiety of the alkoxy group is butyl.

References Cited in the file of this patent

UNITED STATES PATENTS

| | | |
|---|---|---|
| 2,048,799 | Lawson | July 28, 1936 |
| 2,469,625 | Barry | May 10, 1949 |
| 2,587,295 | Doyle et al. | Feb. 26, 1952 |
| 2,637,719 | Dereich | May 5, 1953 |
| 2,718,508 | Rauner | Sept. 20, 1955 |